No. 618,370. Patented Jan. 24, 1899.
A. W. ALLEN.
FLY TRAP.
(Application filed May 5, 1898.)
(No Model.)
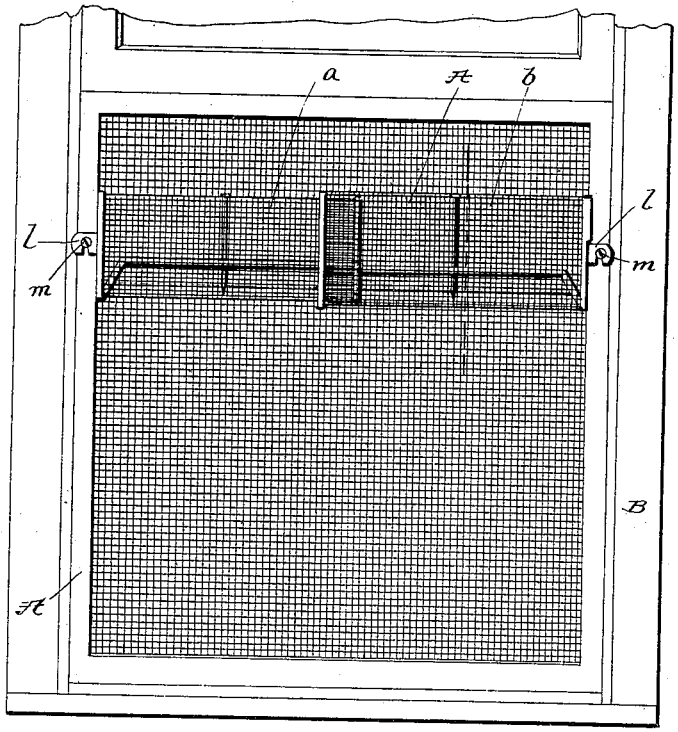
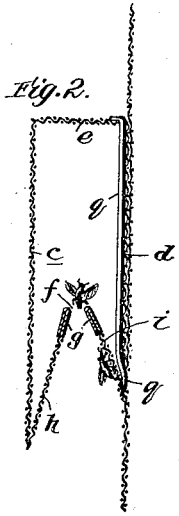
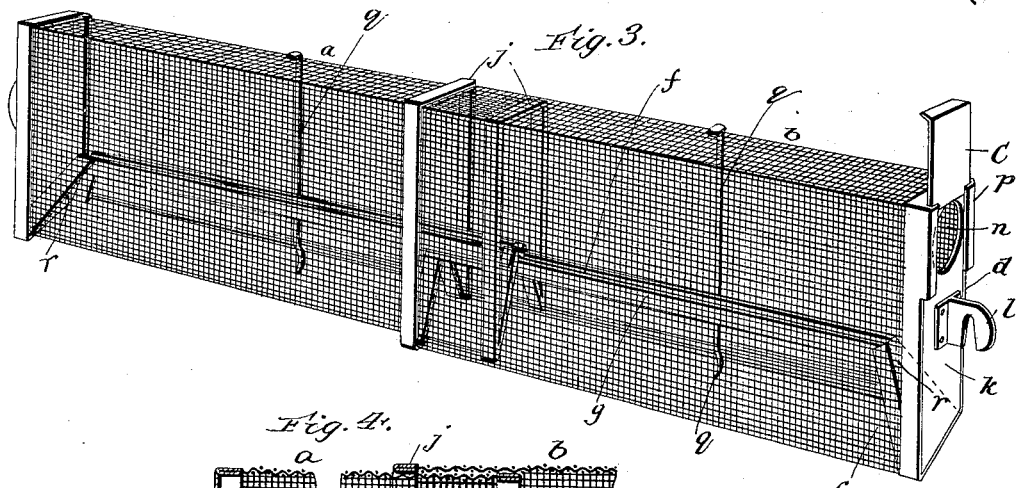
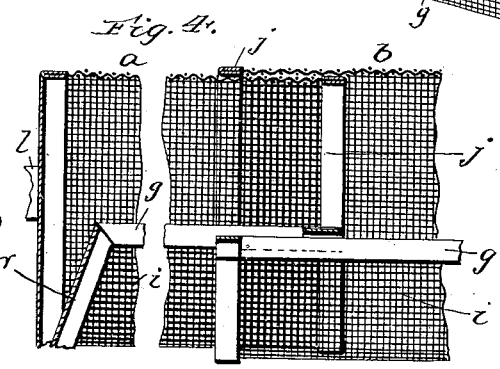
Witnesses:
Inventor
A. W. Allen.
By James Sheehy
Attorney

UNITED STATES PATENT OFFICE.

ALONZO W. ALLEN, OF STREATOR, ILLINOIS, ASSIGNOR OF ONE-HALF TO JOSEPH W. ARGUBRIGHT, OF SAME PLACE.

FLY-TRAP.

SPECIFICATION forming part of Letters Patent No. 618,370, dated January 24, 1899.

Application filed May 5, 1898. Serial No. 679,823. (No model.)

*To all whom it may concern:*

Be it known that I, ALONZO W. ALLEN, a citizen of the United States, residing at Streator, in the county of La Salle and State of Illinois, have invented new and useful Improvements in Fly-Traps, of which the following is a specification.

This invention relates to a fly-trap, and contemplates the provision of a trap to be used at a window-opening and in conjunction with a fly-screen therein, to so construct the trap that it may be used on any form of screen and on windows of any width, to adapt the parts for ready adjustment, so that the trap may be applied snugly to and removed from the screen, and to afford a ready and convenient means of discharging the entrapped flies or dead flies, as the case may be.

With the foregoing and other ends in view the invention will be fully understood from the following description and claims when taken in conjunction with the annexed drawings, in which—

Figure 1 is a front view of a part of a window with a fly-screen in position and my improved trap applied thereto. Fig. 2 is a vertical sectional view taken at the point indicated by the dotted line $x\,x$ on Fig. 1. Fig. 3 is a perspective view of my improved trap removed from the screen, and Fig. 4 is a longitudinal sectional view with parts broken away.

Referring by letter to said drawings, A indicates a fly-screen, which may be of any ordinary or approved construction, and B indicates a window-casing, which is here shown for the purpose of illustrating one mode of using my improved trap, as neither the casing nor screen form any part of my invention.

My improved trap is composed mainly of wire of a weave or mesh such as ordinarily used in fly-traps or window-screens. In the present illustration of my invention I have shown the body of a general rectangular form and comprising two slidable sections $a$ and $b$; but I do not wish to confine myself to making it in two sections, for although such construction is preferable and most practical, as the device can by such construction be adjusted to windows of different widths, it is obvious, however, that in making the trap for a screen or window of a standard width the trap may be made of a single section or part. The body of wire, which may have the sides $c\,d$ parallel and the top $e$ horizontal, has its longitudinal edges terminating in vertically-oblique portions between the walls $c$ and $d$ and spaced to form an entrance $f$. These longitudinal edges are preferably provided with the bindings $g$ of sheet metal or the like, and the walls $h$ and $i$ converge downwardly, so as to meet the lower edges of the walls $c$ and $d$ at acute angles. The edges of the oblique walls, which are bound with metal, may be braced apart at suitable intervals and may be also stayed apart at their ends, and the inner end of each section is also preferably provided with a protective binding $j$, of sheet metal or the like. The outer end of each section when more than one section is used or the ends of a single section is closed by a plate $k$, of tin, sheet metal, or other suitable material, and each end wall is provided with a hook $l$ for the purpose of hanging the same to the screen A, screws $m$ or the like being placed in the frame of the screen to receive the hooks and allow the trap to be suspended thereon. These hooks are preferably placed at such a point on the end walls $k$ so that the trap may be placed snugly against the screen A, and one or both of the end walls may have an opening $n$ for the outlet or discharge of the flies when it is desirable to remove the same from the trap. This opening should have a suitable door or cover, which, for the sake of cheapness, may comprise a slide C, arranged in ways or grooves formed by flanges $p$, which may be produced by shaping the end walls or securing separate pieces thereon at opposite sides of the opening.

It will be observed that the forward or vertical wall $d$ is of less vertical length than the wall $c$, so that the apex of the walls $c$ and $h$ will be much lower than that of the walls $d$ and $i$, so as to give a more flaring or attractive entrance to the trap. In order that the trap may bear snugly against the screen A, I provide the forward walls with points or hooks $q$. These points or hooks are preferably arranged at the apex of the walls $d$ and $i$ and project sufficiently from the same to be hooked into the screen A at the desired altitude. I have shown these points or hooks $q$ as comprising rods extending the full height of the wall $d$, with their upper ends turned slightly over the top wall and secured thereto; but it is obvious that these hooks or points may be made in many other ways and suitably secured at the desired place on the walls $d$, so as to engage the screen.

Each end of the converging walls $h$ and $i$ may be closed by an upwardly and inwardly inclined wall $r$, so as to more effectively direct the flies to the trap; but even this form might be changed or, in fact, omitted altogether and the material of the walls $h$ and $i$ carried up to the end walls $k$ of the trap.

While I have found it most convenient and desirable to make the body of the trap in angular form, yet I am aware that the shape might be changed to any suitable form, so long as the entrance is directed from below upwardly, and I am also aware that other means than I have shown can be provided for securing the trap to a window-frame.

Having thus described my invention, what I claim is—

1. A fly-trap comprising two slidable, telescoping sections whereby its length may be increased or diminished, and having an entrance in each section for flies, substantially as specified.

2. A fly-trap having its entrance from below upwardly and also having means for securing it to the frame of a window-screen, and other means for securing it directly to the material of the screen.

3. A fly-trap comprising two slidable telescoping sections each having an entrance from below upwardly and adapted to be secured to a window-screen, substantially as specified.

4. A fly-trap composed of wire-gauze and having its entrance from below upwardly and also having the vertical rods $q$ extending the full height of its forward wall and terminating at their lower ends in hooks adapted to engage a window-screen, substantially as specified.

5. The improved fly-trap comprising the two slidable sections having means on their end walls for attachment to a window-screen, and having other means for engaging the screen so that the trap may be held snugly against the screen, substantially as specified.

In testimony whereof I have hereunto set my hand in presence of two subscribing witnesses.

ALONZO W. ALLEN.

Witnesses:
GEO. W. ROSS,
J. S. RYAN.